United States Patent
Albou et al.

(10) Patent No.: US 10,677,409 B2
(45) Date of Patent: Jun. 9, 2020

(54) VARIABLE APERTURE BEAM MOTOR VEHICLE HEADLAMP LIGHTING MODULE

(71) Applicant: VALEO VISION, Bobigny (FR)

(72) Inventors: Pierre Albou, Bobigny (FR); Xavier Morel, Bobigny (FR); Hafid El Idrissi, Bobigny (FR); Stephan Sommerschuh, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/663,159

(22) Filed: Jul. 28, 2017

(65) Prior Publication Data

US 2018/0031195 A1 Feb. 1, 2018

(30) Foreign Application Priority Data

Jul. 29, 2016 (FR) ...................................... 16 57436

(51) Int. Cl.
| | |
|---|---|
| *F21S 41/25* | (2018.01) |
| *F21S 41/16* | (2018.01) |
| *F21S 41/675* | (2018.01) |
| *F21S 45/10* | (2018.01) |
| *F21S 41/50* | (2018.01) |
| *G02B 26/08* | (2006.01) |

(52) U.S. Cl.
CPC .............. *F21S 41/25* (2018.01); *F21S 41/16* (2018.01); *F21S 41/50* (2018.01); *F21S 41/675* (2018.01); *F21S 45/10* (2018.01); *G02B 26/0833* (2013.01)

(58) Field of Classification Search
USPC .................................. 362/459–460, 509–522
See application file for complete search history.

(56) References Cited

U.S. PATENT DOCUMENTS

| 2014/0029282 A1 | 1/2014 | Ravier et al. |
| 2015/0285458 A1 | 10/2015 | Dassanayake et al. |
| 2015/0345729 A1* | 12/2015 | Liao .................... F21S 48/125 |
| | | 362/510 |

FOREIGN PATENT DOCUMENTS

| EP | 2 690 352 A1 | 1/2014 |
| EP | 2 990 264 A2 | 3/2016 |
| EP | 2 990 264 A3 | 3/2016 |

OTHER PUBLICATIONS

French Preliminary Search Report dated Jan. 11, 2017 in French Application 16 57436 filed on Jul. 29, 2016 (with English Translation of Categories of cited documents).

* cited by examiner

*Primary Examiner* — Matthew Mikels
(74) *Attorney, Agent, or Firm* — Oblon, McClelland, Maier & Neustadt, L.L.P.

(57) ABSTRACT

The present invention relates to a lighting module for a motor vehicle headlamp module including a light source able to emit light radiation, a processing device able to generate a light flux from said light radiation, and an imaging optical system able to project an exit beam from said light flux. The lighting module includes means for controlling an angular aperture of the exit beam, the angular aperture being chosen from a first aperture and a second aperture, the first aperture corresponding to a wider angle than the second aperture, so that, for a given intensity of the light radiation of the light source, the exit beam corresponding to the second aperture has a higher light intensity than the exit beam corresponding to the first aperture.

22 Claims, 2 Drawing Sheets

VARIABLE APERTURE BEAM MOTOR VEHICLE HEADLAMP LIGHTING MODULE

The present invention relates to a motor vehicle headlamp lighting module of the type comprising: at least one first light source able to emit light radiation; at least one processing device able to generate a light flux from said light radiation; and an imaging optical system able to project an exit beam from said light flux.

It is known to provide, at the front of a motor vehicle, headlamps able to form light beams in order to fulfill various lighting functions, for example of the "high beam" or "low beam" type.

The light devices called adaptive light devices allow the intensity, the dimensions and/or the direction of the beams to be adjusted depending on traffic conditions, in order to fulfill these various functions.

Each headlamp in general includes a plurality of lighting modules that allow a light beam of the headlamp to be formed. The modules may be turned on or turned off independently of one another in order to make the characteristics of the beam vary in real time.

By lighting module what is meant is an assembly containing at least one light source and one reflecting or projecting optical system, such as described in document EP2690352.

Depending on the lighting functions implemented by the lighting modules, the required light intensity is higher or lower. For example, for a vehicle moving rapidly over a substantially straight and clear road, it is advantageous to provide intense lighting in order to illuminate the road over a large distance.

Lighting modules comprising a plurality of light sources able be to be combined to form a more intense exit beam do exist. Such a multiplicity of light sources however increases the cost of the module.

The aim of the present invention is to make the intensity of the exit beam vary without multiplying the light sources of a given module.

To this end, one subject of the invention is a lighting module of the aforementioned type, comprising means for controlling an angular aperture of the exit beam, said angular aperture being chosen from a first aperture and a second aperture, said first aperture corresponding to a wider angle than said second aperture, so that, for a given intensity of the light radiation of the first light source, the exit beam corresponding to the second aperture has a higher light intensity than the exit beam corresponding to first aperture.

By "angular aperture of the exit beam", what is meant is the width of the beam projected onto the road.

According to other advantageous aspects of the invention, the lighting module includes one or more of the following features, implemented in isolation or in any technically possible combination:

the lighting module furthermore comprises means for modifying over time a light intensity of at least one portion of the exit beam, independently of the angular aperture of said exit beam;

the at least one processing device comprises: a movable reflecting device, able to deviate the light radiation in an angular scan; and a device for converting the wavelength of said deviated light radiation, able to generate a light flux in the direction of the imaging optical system; the means for controlling an angular aperture of the exit beam comprising means for controlling an aperture of the angular scan of the movable reflecting device, said aperture of the angular scan being chosen from a first aperture and a second aperture, said first aperture corresponding to a wider angle than said second aperture;

the lighting module comprises means for controlling the first light source between an on state and an off state depending on a position of the movable reflecting device, so as to create a dark zone in the exit beam;

the at least one processing device comprises a matrix array of micro-mirrors that are orientable independently of one another, said matrix array of micro-mirrors being able to generate a light flux in the direction of the imaging optical system, said imaging optical system comprising a variable focal length objective, the means for controlling an angular aperture of the exit beam comprising means for controlling the focal length of said variable focal length objective; and the lighting module comprises at least one second light source, able to generate a secondary beam adjacent to the exit beam.

The invention furthermore relates to a motor-vehicle headlamp comprising a lighting module such as described. The above invention furthermore relates to a lighting method for a motor vehicle comprising a headlamp such as described above, said method comprising the following steps: detecting at least one parameter relating to a movement and/or an environment of the vehicle; and choosing the angular aperture of the exit beam, from the first aperture and the second aperture, depending on the at least one parameter.

The invention furthermore relates to a motor vehicle comprising means for implementing the lighting method such as described above.

The invention will be better understood on reading the following description, which is given merely by way of nonlimiting example and with reference to the drawings, in which.

Figure 1:
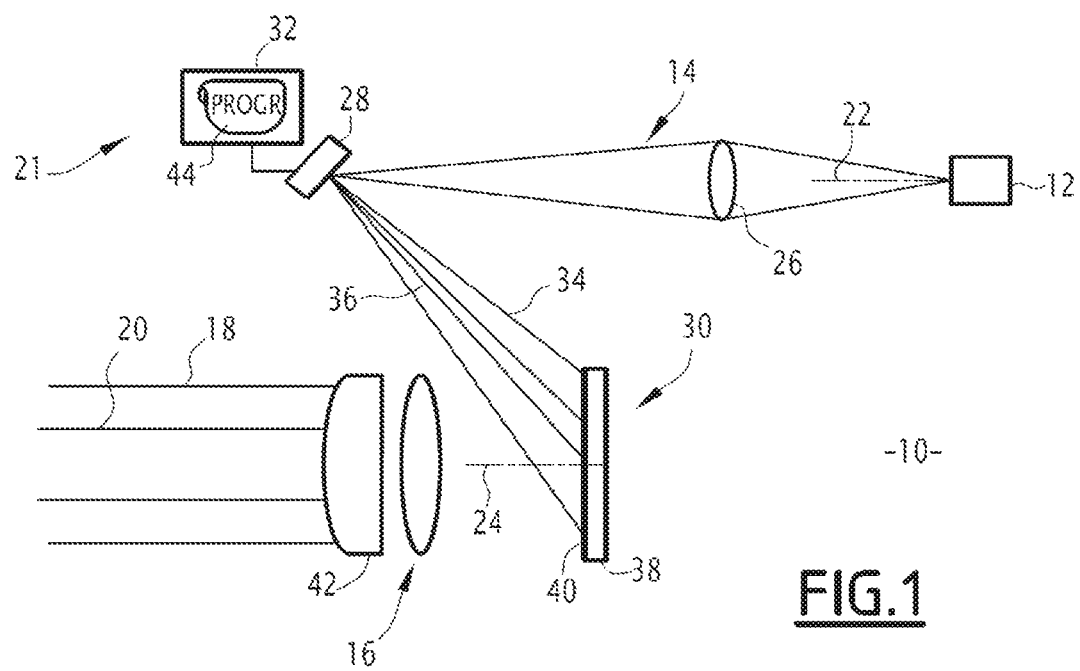
FIG. 1 is a schematic representation of a lighting module according to a first embodiment of the invention.
Figure 2:
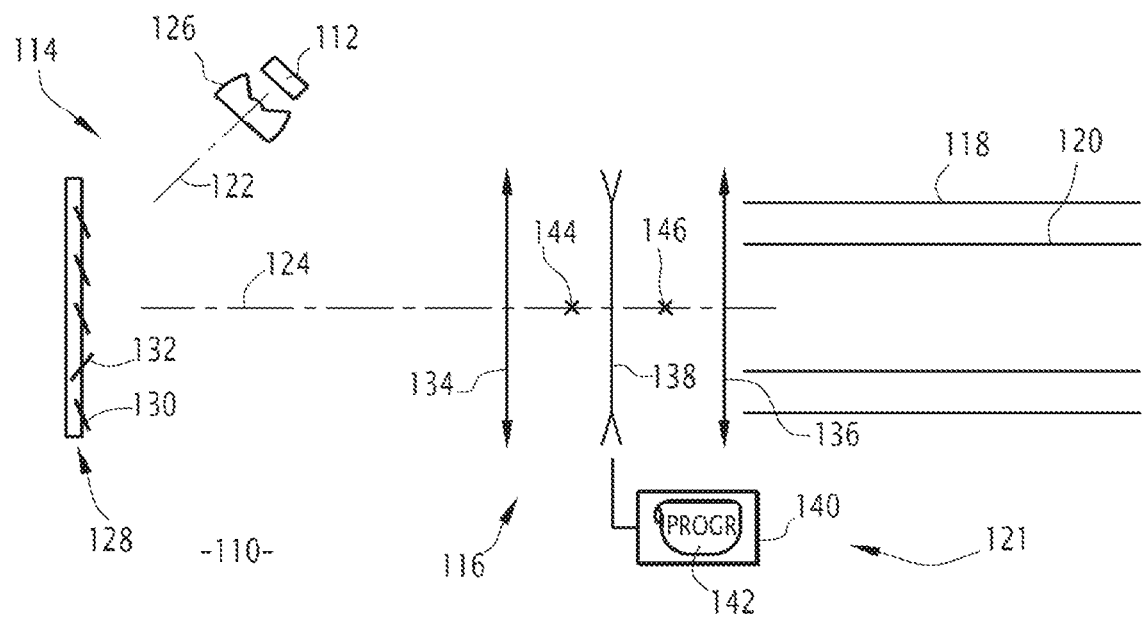
FIG. 2 is a schematic representation of a lighting module according to a second embodiment of the invention.

FIGS. 1 and 2 show lighting modules 10, 110 according to a first and second embodiment of the invention, respectively. The lighting modules 10, 110 are intended to be installed in a motor-vehicle headlamp.

Each of the lighting modules 10, 110 comprises: a first light source 12, 112 able to emit light radiation; a processing device 14, 114 able to generate a light flux from said light radiation; and an imaging optical system 16, 116 able to project an exit beam 18, 118, 20, 120 from said light flux.

Each of the lighting modules 10, 110 furthermore comprises means 21, 121 for controlling an angular aperture of said exit beam. Said controlling means 21, 121 allow said angular aperture to be chosen from a first aperture 18, 118 and a second aperture 20, 120, said first aperture corresponding to a wider angle than said second aperture. The means 21, 121 for controlling angular aperture will be described in detail below.

The first light source 12, 112 is placed on a first emission axis 22, 122. The first light source 12, 112 is preferably a semiconductor light source and more preferably a laser diode.

The laser diode 12 of the lighting module 10 for example emits visible radiation the wavelength of which is comprised between 400 nm and 500 nm and preferably comprised between 440 nm and 470 nm, i.e. a "blue laser".

Alternatively, the first light source 112 of the lighting module 110 is a light-emitting diode.

The processing device 14, 114 is able to generate a light flux along a second emission axis 24, 124 that is distinct from the first emission axis 22, 122. In the embodiment of FIG. 1, the first and second axes 22, 24 are substantially parallel, but may as a variant be inclined with respect to each other. In the embodiment of FIG. 2, the first and second axes 122, 124 are inclined with respect to each other.

The lighting module 10 of FIG. 1 will more specifically be described.

The processing device 14 in particular includes a lens 26, a reflector 28 and a device 30 for converting wavelength. The processing device 14 furthermore includes an electronic device 32 for controlling the reflector 28.

The lens 26 is able to concentrate the radiation emitted by the laser diode 12, in the direction of the reflector 28.

The reflector 28 is able to send toward the converting device 30 light radiation 34, 36 emitted by the laser diode 12 and concentrated by the lens 26. The reflector 28 is movable in one or two directions, so as to form a scanning system. The reflector 28 is for example formed from a plurality of mirrors that are independently movable. The movement of the mirrors of the reflector is in particular controlled by the electronic device 32, as described in detail below.

The device 30 for converting wavelength is for example formed from a sheet 38 of a medium that reflects the laser radiation, on which medium is placed a continuous and uniform layer 40 of luminophore. The sheet 38, which is for example made of aluminum, is placed in a plane that is substantially perpendicular to the second emission axis 24.

A device analogous to the processing device 14 is in particular described in document EP2690352.

The imaging optical system 16 for example comprises one or more lenses 42. The imaging optical system 16 has a focal plane close to a plane of the sheet 38, so as to project an exit beam 18, 20 corresponding to a light flux emitted by the converting device 30.

The means 21 for controlling an angular aperture of said exit beam comprise a program 44, stored in the electronic device 32 for controlling the reflector 28.

The program 44 controls an aperture of the angular scan of the reflector 28, said aperture of the angular scan being chosen from a first aperture 34 and a second aperture 36. The first aperture 34 corresponds to a wider angle than the second aperture 36.

For example, the electronic device 32 allows automatic control loops to be implemented in order to obtain a constant electric field in proximity to the reflector 28. Specifically, the mirrors of this type of device are very sensitive to external factors such as temperature.

On reception of a control signal, the program 44 is able to choose between two automatic control loops, each of said loops corresponding to an aperture 34 or 36. In practice, a change of loop for example corresponds to a change of voltage or electrical current.

In a known way, each point of the layer 40 of the converting device 30, receiving the "blue" monochromatic and coherent laser radiation sent by the reflector 28, reemits light that is considered to be "white", i.e. including a plurality of wavelengths of between about 400 nm and 800 nm. A luminous image is thus formed on the layer 40, the area occupied by said image depending on the aperture 34, 36 of the angular scan of the reflector 28.

For a given amount of light emitted by the laser diode 12, the intensity of said luminous image is inversely dependent on the scanned area. In other words, the wider first aperture 34 corresponds to a luminous image that is less intense than the narrower second aperture 36.

The imaging optical system 16 forms an exit beam 18, 20 corresponding to a projection to infinity, along the second axis 24, of the luminous image formed on the layer 40 of luminophore of the converting device 30. The first aperture 18 and second aperture 20 of the exit beam correspond to the first aperture 34 and second aperture 36 of the angular scan of the reflector 28, respectively.

Thus, for the lighting module 10 of FIG. 1, the exit beam corresponding to the second aperture 20 has a higher light intensity than the exit beam corresponding to the first aperture 18.

The lighting module 110 of FIG. 2 will more specifically be described.

The processing device 114 in particular includes a collimator 126 and a matrix array 128 of micro-mirrors.

The collimator 126 is able to send toward the matrix array 128 the radiation emitted by the laser diode 112, in the form of convergent rays.

The matrix array 128 is placed substantially in a plane perpendicular to the second axis of emission 124. The matrix array 128 is formed from micro-mirrors 130, 132 that are orientable independently of one another, the orientation of each micro-mirror being controlled over time by an electronic device (not shown). Each of the micro-mirrors 130, 132 is for example able to pivot about an axis comprised in the plane of the matrix array 128. Such a matrix array of micro-mirrors, known as a DMD (digital micro-mirror device), is in particular described in document US2015/0160454.

At least some 130 of the micro-mirrors of the matrix array 128 are oriented so as to redirect the light of the light source 112 toward the imaging optical system 116.

Said imaging optical system 116 is able to project an exit beam 118, 120 along the second emission axis 124, from a light flux emitted by the matrix array 128.

More precisely, the imaging optical system 116 is a variable focal length system, for example comprising two convergent lenses 134, 136, placed on either side of a divergent lens 138 along the second axis 124. The divergent lens 138 is movable along said second axis 124 between the two convergent lenses 134, 136. The imaging optical system 116 also includes an electronic device 140 for controlling a movement of the divergent lens 138.

The means 121 for controlling an angular aperture of said exit beam comprise a program 142 stored in said electronic device 140. The program 142 controls a position of the divergent lens 138 on the second axis 124, between the two convergent lenses 134, 136. A first position 144 and a second position 146 correspond to the first angular aperture 118 and the second angular aperture 120 of the exit beam, respectively.

For a given amount of light emitted by the laser diode 112, the intensity of the beam corresponding to the wider first aperture 118 is lower than the intensity of the beam corresponding to the narrower second aperture 120.

The means 21, 121 for controlling an angular aperture of the exit beam therefore allow a light intensity of said exit beam to be modified.

Figure 3:
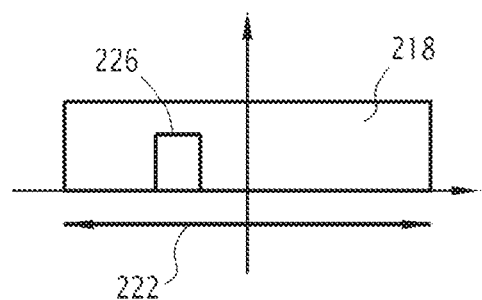
FIG. 3 is a schematic representation of a beam projected by a lighting module according to one embodiment of the invention, in a first configuration.
Figure 4:
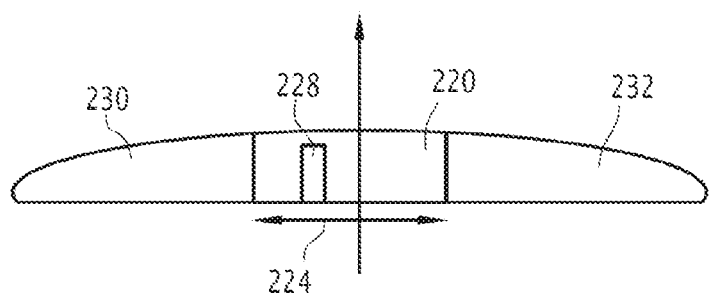
FIG. 4 is a schematic representation of a beam projected by the same lighting module in a second configuration.

By way of illustration, FIGS. 3 and 4 schematically show projections of a first beam 218 and of a second beam 220, corresponding to the first aperture 18, 118 and to the second aperture 20, 120 of the lighting module 10, 110 described above, respectively.

The first beam 218 has a horizontal spread 222 of ±15°; the second beam 220 has a horizontal spread 224 of ±6°. The intensity of the second beam 220 is higher than that of the first beam 218.

Preferably, the lighting module 10, 110 furthermore comprises means for modifying over time a light intensity of at least one portion 226, 228 of the exit beam, independently of the angular aperture of said exit beam. More precisely, it is possible to create a dark zone 226, 228 that is precisely located in the exit beam 218, 220. The lighting module that may thus implement an anti-glare function.

In the embodiment in FIG. 1, the electronic device 32 of the reflector 28 is also connected to the laser diode 12. In the case where the dark zone is required by the program 44, the latter associates a certain position of said reflector 28 with the turning-off of said diode. Thus, some points of the layer 40 of the converting device 30 do not receive laser radiation. The exit beam 218, 220 that results therefrom includes a dark zone 226, 228 that is located in a precise location in said beam.

In the embodiment in FIG. 2, some micro-mirrors 132 are oriented so as not to redirect the light of the light source 112 toward the imaging optical system 116. Thus, the resultant image 218, 220 of the matrix array 128 by the imaging optical system 116 includes a dark zone 226, 228 that is precisely located.

Preferably, the module 10, 110 of FIG. 1 or 2 furthermore includes at least one second light source (not shown) and more preferably one second light source and one third light source. With reference to FIG. 4, when the exit beam 220 is configured with its smallest spread 224, said second and third light sources are able to generate secondary beams 230, 232, that are located on either side of the exit beam 220. These secondary beams allow, if needs be, the width of the main beam 220 to be complemented.

According to another embodiment, the headlamp equipped with the module 10, 110 includes secondary modules able to generate the secondary beams 230, 232.

Secondary beams 230, 232 of the "sail" type, such as described in document EP2672170, may in particular be used.

Figure 5:
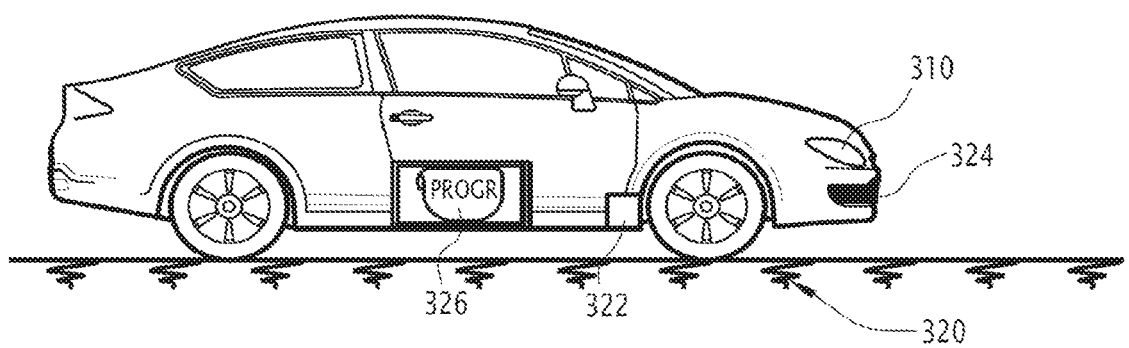
FIG. 5 is a schematic representation of a motor vehicle comprising a headlamp according to one embodiment of the invention.

FIG. 5 schematically shows a motor vehicle 300, equipped with at least one headlamp 310, said headlamp comprising a lighting module 10 or 110 corresponding to the embodiment of one of FIGS. 1 and 2.

Preferably, the motor vehicle 300 comprises two substantially identical headlamps 310 located at the front of said vehicle.

The motor vehicle 300 furthermore comprises a device 320 implementing a method for operating the headlamps 310.

Said device 320 comprises one or more detectors 322, 324 of a least one parameter relating to a movement and/or to an environment of the vehicle 300. For example, the device 320 comprises a first detector 322 of the speed of said vehicle 300 and a second detector 324 of obstacles in front of said vehicle 300.

The device 320 furthermore comprises a program 326 for implementing a method for operating the headlamps 310, which is described below.

By default, the headlamps 310 are considered to be configured so that the exit beam of the modules 10, 110 is in its widest and therefore least intense first configuration 218.

The first detector 322 measures the speed of the vehicle 300 and the second detector 324 estimates a number of other vehicles approaching said vehicle 300 from in front. Beyond a certain speed threshold, for example 110 km/h, and if the road is sufficiently clear in front, the program 326 makes the exit beam of the modules 10, 110 switch i.e. to its narrower and therefore most intense second configuration 220. The driver of the vehicle 300 thus has a better view of the road over which said vehicle is driving.

Such a method allows the light emitted by the first light source 12, 112 of the lighting module 10, 110 to be concentrated when the circumstances do not require this light to be spread via the exit beam. More intense lighting is thus obtained from the same light source 12, 112.

Depending on other parameters, the program 326 also makes the secondary beams 230, 232 turn on and/or causes the dark zone 226, 228 to be generated in order to avoid dazzling drivers approaching from in front.

The invention claimed is:

1. Lighting module for a motor vehicle headlamp, said module comprising:
   at least one first light source able to emit light radiation;
   at least one processing device able to generate a light flux from said light radiation; and
   an imaging optical system able to project an exit beam from said light flux;
   wherein the processing device comprises means for receiving light radiation from the light source, reflecting the received light radiation to be received by the imaging optical system, and controlling an angular aperture of the reflected light radiation in one of a first aperture and a second aperture, said first aperture corresponding to a wider angle than said second aperture and the reflected light radiation having a lower intensity in said first aperture,
   so that, for a given intensity of the light radiation of the first light source, the exit beam has a first state corresponding to the second aperture with a higher light intensity than a separate second state corresponding to the first aperture.

2. Lighting module according to claim 1, further comprising means for modifying over time a light intensity of at least one portion of the exit beam, independently of the angular aperture of said exit beam.

3. Lighting module according to claim 2, wherein the at least one processing device comprises:
   a movable reflecting device, able to deviate the light radiation in an angular scan; and
   a device for converting the wavelength of said deviated light radiation, able to generate a light flux in the direction of the imaging optical system;
   the means for controlling an angular aperture of the exit beam comprising means for controlling an aperture of the angular scan of the movable reflecting device, said aperture of the angular scan being chosen from a first aperture and a second aperture, said first aperture corresponding to a wider angle than said second aperture.

4. Lighting module according to claim 3, comprising means for controlling the first light source between an on state and an off state depending on a position of the movable reflecting device, so as to create a dark zone in the exit beam.

5. Lighting module for a motor vehicle headlamp, comprising:
at least one first light source able to emit light radiation;
at least one processing device able to generate a light flux from said light radiation; and
an imaging optical system able to project an exit beam from said light flux;
means for controlling an angular aperture of said exit beam, said angular aperture being chosen from a first aperture and a second aperture, said first aperture corresponding to a wider angle than said second aperture, and
means for modifying over time a light intensity of at least one portion of the exit beam, independently of the angular aperture of said exit beam,
wherein for a given intensity of the light radiation of the first light source, the exit beam corresponding to the second aperture has a higher light intensity than the exit beam corresponding to the first aperture, and
wherein the at least one processing device comprises a matrix array of micro-mirrors that are orientable independently of one another, said matrix array of micro-mirrors being able to generate a light flux in the direction of the imaging optical system,
said imaging optical system comprising a variable focal length objective,
the means for controlling an angular aperture of the exit beam comprising means for controlling a focal length of said variable focal length objective.

6. Lighting module according to claim 1, comprising at least one second light source, able to generate a secondary beam adjacent to the exit beam.

7. Motor vehicle headlamp, comprising a lighting module according to claim 1.

8. Lighting method for a motor vehicle comprising a headlamp according to claim 7, said method comprising the following steps:
detecting at least one parameter relating to a movement and/or an environment of the vehicle; and
choosing the angular aperture of the reflected light radiation, from the first aperture and the second aperture, depending on the at least one parameter.

9. Motor vehicle comprising means for implementing the lighting method according to claim 8.

10. Lighting module according to claim 1, wherein the at least one processing device comprises:
a movable reflecting device, able to deviate the light radiation in an angular scan; and
a device for converting the wavelength of said deviated light radiation, able to generate a light flux in the direction of the imaging optical system;
the means for controlling an angular aperture of the exit beam comprising means for controlling an aperture of the angular scan of the movable reflecting device, said aperture of the angular scan being chosen from a first aperture and a second aperture, said first aperture corresponding to a wider angle than said second aperture.

11. Lighting module according to claim 2, comprising at least one second light source, able to generate a secondary beam adjacent to the exit beam.

12. Motor vehicle headlamp, comprising a lighting module according to claim 2.

13. Lighting module according to claim 3, comprising at least one second light source, able to generate a secondary beam adjacent to the exit beam.

14. Motor vehicle headlamp, comprising a lighting module according to claim 3.

15. Lighting module according to claim 5, comprising at least one second light source, able to generate a secondary beam adjacent to the exit beam.

16. Motor vehicle headlamp, comprising a lighting module according to claim 5.

17. Lighting module according to claim 1, comprising:
said imaging optical system comprising a variable focal length objective; and
the means for controlling an angular aperture of the exit beam comprising means for controlling a focal length of said variable focal length objective.

18. Lighting module for a motor vehicle headlamp, said module comprising:
at least one first light source able to emit light radiation;
at least one processing device able to generate a light flux from said light radiation; and
an imaging optical system able to project an exit beam from said light flux;
the lighting module being characterized in that it comprises means for controlling an angular aperture of said exit beam, said angular aperture being chosen from a first aperture and a second aperture, said first aperture corresponding to a wider angle than said second aperture,
so that, for a given intensity of the light radiation of the first light source, the exit beam has a first state corresponding to the second aperture with a higher light intensity than a separate second state corresponding to the first aperture,
wherein the imaging optical system comprises two convergent lenses disposed on either side of a divergent lens along an axis of said exit beam, the divergent lens being movable along said axis between the two convergent lenses.

19. Lighting module according to claim 1, wherein, so that, for a given intensity of the light flux produced by the processing device, the exit beam corresponding to the second aperture has a higher light intensity than the exit beam corresponding to the first aperture.

20. A lighting module for a motor vehicle headlamp, said module comprising:
a light source able to emit light radiation;
a wavelength conversion device;
a reflector configured to reflect a first light beam from light radiation received from the light source and directed towards the wavelength conversion device with a first luminous image having a first intensity and a first area and to reflect a separate second beam from said light radiation received from said light source and directed towards the wavelength conversion device with a second luminous image having a second intensity lower than said first intensity and a second area larger than said first area; and
an optical system configured to create separate first and second exit beams projected out of said module based upon the first and second luminous images, respectively.

21. Lighting module according to claim 1, wherein, a width of the exit beam corresponding to the first aperture is wider than a width of the exit beam corresponding to the second aperture.

22. Lighting module according to claim 1, wherein, an optical axis of the radiation from the light source and an optical axis of the exit beam are substantially parallel.

* * * * *